US010560829B2

(12) United States Patent
Haverinen et al.

(10) Patent No.: US 10,560,829 B2
(45) Date of Patent: Feb. 11, 2020

(54) WIRELESS COMMUNICATION FOR ANGLE OF ARRIVAL DETERMINATION

(71) Applicant: QUALCOMM Incorporated, San Diego, CA (US)

(72) Inventors: Anssi Haverinen, San Diego, CA (US); Wen-Hsing Chen, Cupertino, CA (US); Le Luong, San Diego, CA (US); Changhau Lee, Fremont, CA (US); John Saad, Jr., El Cajon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 15/241,784

(22) Filed: Aug. 19, 2016

(65) Prior Publication Data
US 2017/0303071 A1  Oct. 19, 2017

Related U.S. Application Data

(60) Provisional application No. 62/324,778, filed on Apr. 19, 2016.

(51) Int. Cl.
*G01S 3/30* (2006.01)
*G01S 3/48* (2006.01)
(Continued)

(52) U.S. Cl.
CPC ............. *H04W 4/80* (2018.02); *G01S 3/30* (2013.01); *G01S 3/46* (2013.01); *G01S 3/48* (2013.01);
(Continued)

(58) Field of Classification Search
CPC ..... H04L 69/22; G01S 3/48; G01S 3/52; G01S 3/30; H04W 69/22; H04B 17/27
See application file for complete search history.

(56) References Cited

U.S. PATENT DOCUMENTS 8,929,192 B2 * 1/2015 Kainulainen ............. G01S 3/48
342/147
9,084,215 B2 7/2015 Honkanen et al.
(Continued)

FOREIGN PATENT DOCUMENTS

WO  2016010347 A1  1/2016

OTHER PUBLICATIONS

Tarnoff, "Computer Organization and Design Fundamentals", 2005 (Year: 2005).*
(Continued)

Primary Examiner — Omer S Mian
(74) Attorney, Agent, or Firm — Muncy, Geissler, Olds & Lowe, P.C./QUALCOMM

(57) ABSTRACT

In one aspect, a method of wireless communication by a wireless device includes generating, by the wireless device, a protocol data unit (PDU) header and a corresponding PDU payload of an angle of arrival (AoA) packet. The generating of the PDU payload includes inserting a supplemental field and a cyclic redundancy check (CRC) field into the PDU payload. The supplemental field is configured to enable another wireless device to determine an angle of arrival of the AoA packet and the CRC field corresponds to a CRC of at least the supplemental field. The method also includes transmitting the AoA packet with a single antenna of the wireless device.

55 Claims, 12 Drawing Sheets

(51) Int. Cl.
  *H04W 4/80* (2018.01)
  *H04L 29/06* (2006.01)
  *H04W 64/00* (2009.01)
  *G01S 3/46* (2006.01)
  *H04B 17/27* (2015.01)

(52) U.S. Cl.
  CPC ............ *H04B 17/27* (2015.01); *H04L 69/22* (2013.01); *H04W 64/006* (2013.01)

(56) References Cited

U.S. PATENT DOCUMENTS

| | | | |
|---|---|---|---|
| 9,332,523 B2 | 5/2016 | Zhang et al. | |
| 2010/0135495 A1* | 6/2010 | Chion | H04L 1/0079 380/273 |
| 2012/0178471 A1* | 7/2012 | Kainulainen | G01S 5/0009 455/456.1 |
| 2013/0188538 A1* | 7/2013 | Kainulainen | G01S 3/48 370/310 |
| 2013/0321209 A1 | 12/2013 | Kalliola et al. | |
| 2013/0324139 A1* | 12/2013 | Kupershmidt | H04W 72/0453 455/450 |
| 2014/0327579 A1 | 11/2014 | Hart et al. | |
| 2015/0163622 A1* | 6/2015 | Kainulainen | G01S 3/16 455/41.2 |
| 2015/0189619 A1 | 7/2015 | Kalliola et al. | |
| 2016/0105761 A1* | 4/2016 | Polo | H04W 56/001 455/41.2 |
| 2017/0053317 A1* | 2/2017 | Dione | G06Q 30/02 |
| 2017/0187849 A1* | 6/2017 | Mourad | H04H 20/95 |

OTHER PUBLICATIONS

Bluetooth Special Interest Group (SIG): "Connectionless Angle of Departure (AoD) and Connection-Oriented Angle of Arrival (AoA)," Version 4.2, Feb. 10, 2016, pp. 1-78.
International Search Report and Written Opinion—PCT/US2017/022314—ISA/EPO—dated Jul. 6, 2017.

* cited by examiner

WIRELESS COMMUNICATION FOR ANGLE OF ARRIVAL DETERMINATION

CROSS-REFERENCE TO RELATED APPLICATION

The present Application for Patent claims the benefit of U.S. Provisional Application No. 62/324,778, entitled "WIRELESS COMMUNICATION FOR ANGLE OF ARRIVAL DETERMINATION" filed Apr. 19, 2016, assigned to the assignee hereof, and expressly incorporated herein by reference in its entirety.

FIELD OF DISCLOSURE

Disclosed aspects relate to wireless communications. More specifically, exemplary aspects are directed to improvements in generating and receiving an angle of arrival (AoA) packet in a wireless communication system.

BACKGROUND

Wireless communication systems, including data communication systems, have been under continual development for many years. In some applications, there is a desire to determine the directionality of communications transmitted from one wireless device to another.

For example, Bluetooth (BT) Public Indoor Positioning (PIP) (also referred to as HAIP—high accuracy indoor positioning) is one direction finding technique that is based on a single-antenna wireless device (e.g., a Locator) locating position-fixed wireless devices (e.g., Targets or Tags). The BT PIP tags utilize multiple transmitting antennas to allow the BT PIP locator to estimate an Angle of Departure (AoD) of the communications transmitted by the BT PIP tags.

High accuracy asset tracking (HAAT) is another direction finding technique similar to BT PIP, but where a HAAT locator includes multiple antennas to enable the HAAT locator to estimate an Angle of Arrival (AoA) of communications received from a single transmitting antenna of the HAAT tag.

Angle of arrival (AoA) measurement is a method for determining the direction of propagation of a radio-frequency wave incident on an antenna array. AoA may determine the direction by measuring the Time Difference of Arrival (TDOA) at individual elements of the array, from which these delays can be used to estimate the AoA. In some implementations, the TDOA measurement is made by measuring a difference in received phases at each element in the antenna array.

An application of AoA may include aiding in the determination of a geodesic location or geolocation of a wireless device, such as a mobile phone. The aim is either to comply with regulations that require cell systems to report the location of a cell phone placing an emergency (i.e., 911) call or to provide a special service to tell the bearer of the cell phone where he is. One or more base stations (or other wireless devices) could combine measurements obtained from several AoA measurements to determine the mobile phone's location.

SUMMARY

Aspects of the present disclosure include a method, a wireless device, and a computer-readable medium for wireless communications.

For example, according to one aspect, a method of wireless communication by a wireless device includes generating, by the wireless device, a protocol data unit (PDU) header and a corresponding PDU payload of an angle of arrival (AoA) packet. The generating of the PDU payload includes inserting a supplemental field and a cyclic redundancy check (CRC) field into the PDU payload. The supplemental field is configured to enable another wireless device to determine an angle of arrival of the AoA packet and the CRC field corresponds to a CRC of at least the supplemental field. The method also includes transmitting the AoA packet with a single antenna of the wireless device.

According to another aspect, a method of wireless communication by a wireless device includes receiving, at an antenna array of the wireless device, an angle of arrival (AoA) packet from another wireless device and determining whether a protocol data unit (PDU) payload of the AoA packet includes a supplemental field. If the PDU payload includes the supplemental field, then the method includes processing the AoA packet to determine an angle of arrival of the AoA packet based on the supplemental field included in the PDU payload. The processing the AoA packet includes performing a cyclic redundancy check (CRC) based on a CRC field included in the PDU payload, where the CRC field corresponding to a CRC of at least the supplemental field.

In another aspect, a wireless device includes an antenna, a transceiver, memory, and a processor. The processor is coupled to the memory to access and execute instructions included in program code to direct the wireless device to generate a protocol data unit (PDU) header of an angle of arrival (AoA) packet and to generate a PDU payload of the AoA packet corresponding to the PDU header. The instructions to generate the PDU payload include instructions to: (i) insert a supplemental field into the PDU payload to enable another wireless device to determine an angle of arrival of the AoA packet, and (ii) insert a cyclic redundancy check (CRC) field into the PDU payload, the CRC field corresponding to a CRC of at least the supplemental field. Further included in the program code, are instructions to transmit the AoA packet with the antenna.

In yet another aspect, a wireless device includes an antenna array, a transceiver, memory, and a processor. The processor is coupled to the memory to access and execute instructions included in program code to direct the wireless device to receive, at the antenna array, an angle of arrival (AoA) packet from another wireless device and to determine whether a protocol data unit (PDU) payload of the AoA packet includes a supplemental field. If the PDU payload includes the supplemental field the instructions direct the mobile device to process the AoA packet to determine an angle of arrival of the AoA packet based on the supplemental field included in the PDU payload. The instructions to process the AoA packet include instructions to perform a cyclic redundancy check (CRC) based on a CRC field included in the PDU payload, the CRC field corresponding to a CRC of at least the supplemental field.

In another aspect, a non-transitory computer-readable medium includes program code stored thereon for performing wireless communications by a wireless device. The program code includes instructions to generate a protocol data unit (PDU) header of an angle of arrival (AoA) packet and to generate a PDU payload of the AoA packet corresponding to the PDU header. The instructions to generate the PDU payload include instructions to: (i) insert a supplemental field into the PDU payload to enable another wireless device to determine an angle of arrival of the AoA packet, and (ii) insert a cyclic redundancy check (CRC) field into the PDU payload, the CRC field corresponding to a CRC of at least the supplemental field. The program code further includes instructions to transmit the AoA packet with an antenna of the wireless device.

According to another aspect, a non-transitory computer-readable medium includes program code stored thereon for performing wireless communications by a wireless device. The program code includes instructions to receive, at an antenna array of the wireless device, an angle of arrival (AoA) packet from another wireless device and to determine whether a protocol data unit (PDU) payload of the AoA packet includes a supplemental field. If the PDU payload includes the supplemental field, instructions further included in the program code include process the AoA packet to determine an angle of arrival of the AoA packet based on the supplemental field included in the PDU payload. The instructions to process the AoA packet include instructions to perform a cyclic redundancy check (CRC) based on a CRC field included in the PDU payload, the CRC field corresponding to a CRC of at least the supplemental field.

A wireless device is also provided according to another aspect, where the wireless device includes means for generating a protocol data unit (PDU) header of an angle of arrival (AoA) packet, and means for generating a PDU payload of the AoA packet corresponding to the PDU header. The means for generating the PDU payload includes: (i) means for inserting a supplemental field into the PDU payload to enable another wireless device to determine an angle of arrival of the AoA packet, and (ii) means inserting a cyclic redundancy check (CRC) field into the PDU payload, the CRC field corresponding to a CRC of at least the supplemental field. The wireless device also includes means for transmitting the AoA packet.

According to another aspect, a wireless device includes means for receiving an angle of arrival (AoA) packet from another wireless device, and means for determining whether a protocol data unit (PDU) payload of the AoA packet includes a supplemental field. If the PDU payload includes the supplemental field, a means processing the AoA packet determines an angle of arrival of the AoA packet based on the supplemental field included in the PDU payload. The means for processing the AoA packet includes means for performing cyclic redundancy check (CRC) based on a CRC field included in the PDU payload, the CRC field corresponding to a CRC of at least the supplemental field.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Various aspects are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program code including instructions being accessed and executed by one or more processors, or by a combination of both. Additionally, these sequence of actions described herein can be considered to be embodied entirely within any form of non-transitory computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter.

Figure 1:
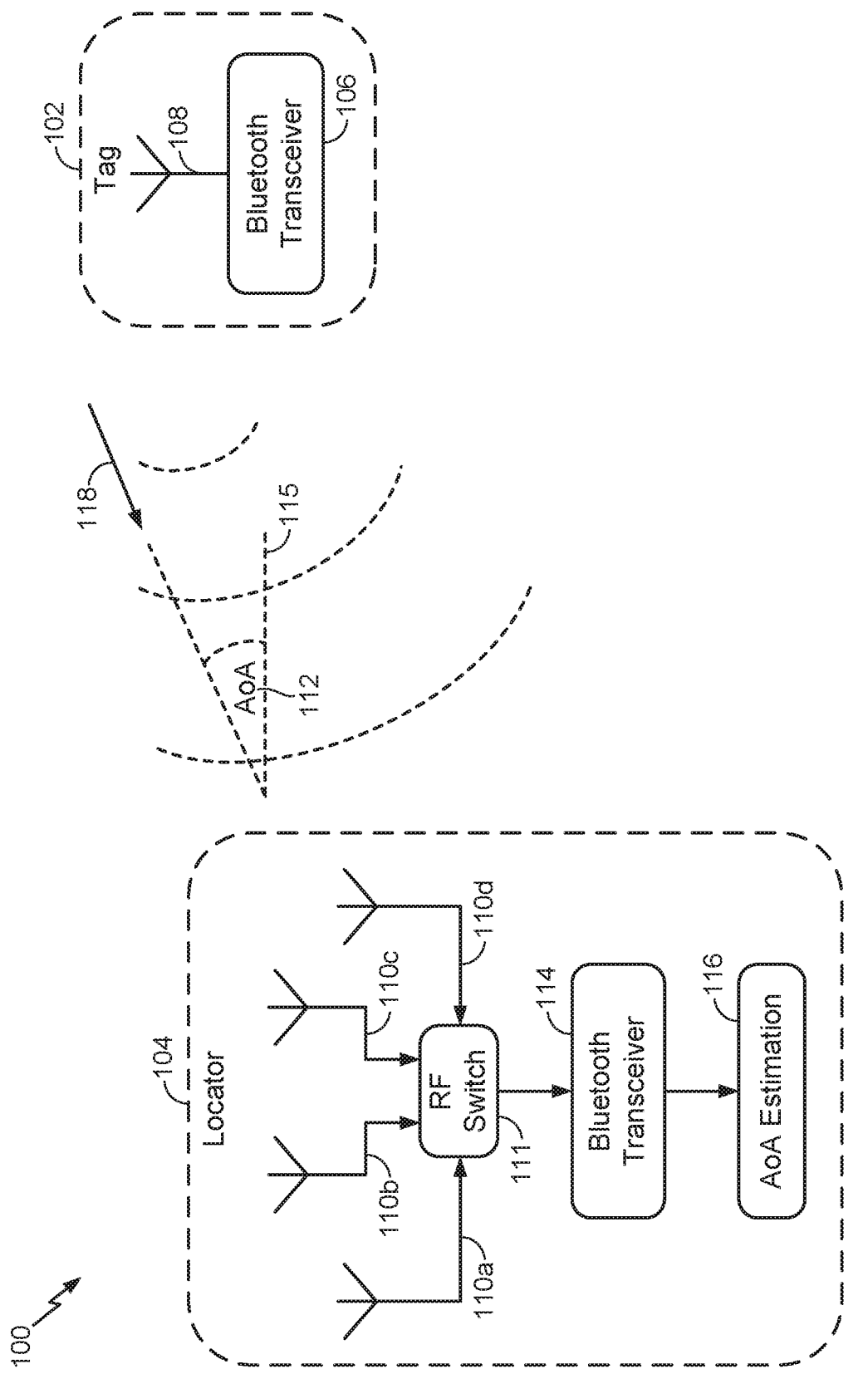
FIG. 1 illustrates an example wireless communication system, according to aspects of the disclosure.

FIG. 1 illustrates an example wireless communication system 100, according to aspects of the disclosure. The illustrated example of wireless communication system 100 includes a first wireless device 102 (i.e., a tag) and a second wireless device 104 (i.e., a locator). The first wireless device 102 is shown as including a Bluetooth transceiver 106 coupled to a single transmitting antenna 108. The second wireless device 104 is shown as including antennas 110A-D (collectively referred to as an antenna array) coupled to a radio frequency (RF) switch 111. The RF switch 111 is coupled to a Bluetooth transceiver 114. The second wireless device 104 also includes an angle of arrival (AoA) estimation block 116 coupled to the Bluetooth transceiver 114.

In operation, the first wireless device 102 is configured to transmit an AoA packet 118 with the single transmitting antenna 108. In one example, the first wireless device 102 may transmit the AoA packet 118 in response to a request (not shown) received from the second wireless device 104. The AoA packet 118 is then received at the antenna array (i.e., antennas 110A-D) of the second wireless device 104. Utilizing the RF switch 111 and the Bluetooth transceiver 114, the AoA estimation block 116 may then determine the AoA 112 of the received AoA packet 118. For example, as mentioned above, the AoA estimation block 116 may estimate the AoA 112 by measuring the Time Difference of Arrival (TDOA) at individual antennas 110A-D of the array, from which these delays can be used to estimate the AoA 112. In some implementations, the TDOA measurement is made by measuring a difference in received phases between each of the antennas 110A-D. In one aspect, the AoA 112 is representative of an angle between the second wireless device 104 and the first wireless device 102 with respect to a known reference 115. In one example, the known reference 115 may be a fixed heading, such as magnetic north, obtained from one or more other sensors, such as a compass (not shown), of the second wireless device 104.

As will be discussed in more detail below, the AoA packet 118 may have a structure that enables the second wireless device 104 to determine the AoA 112 of the received AoA packet 118. For example, the AoA packet 118 may include a supplemental field that includes a string of bits having the same logic state (e.g., a logic "1"). The string of bits of the supplemental field results in the transmission of a continuous waveform by the first wireless device 102, which can then be used by the second wireless device 104 to measure the phase differences with the antennas 110A-D.

Figure 2:
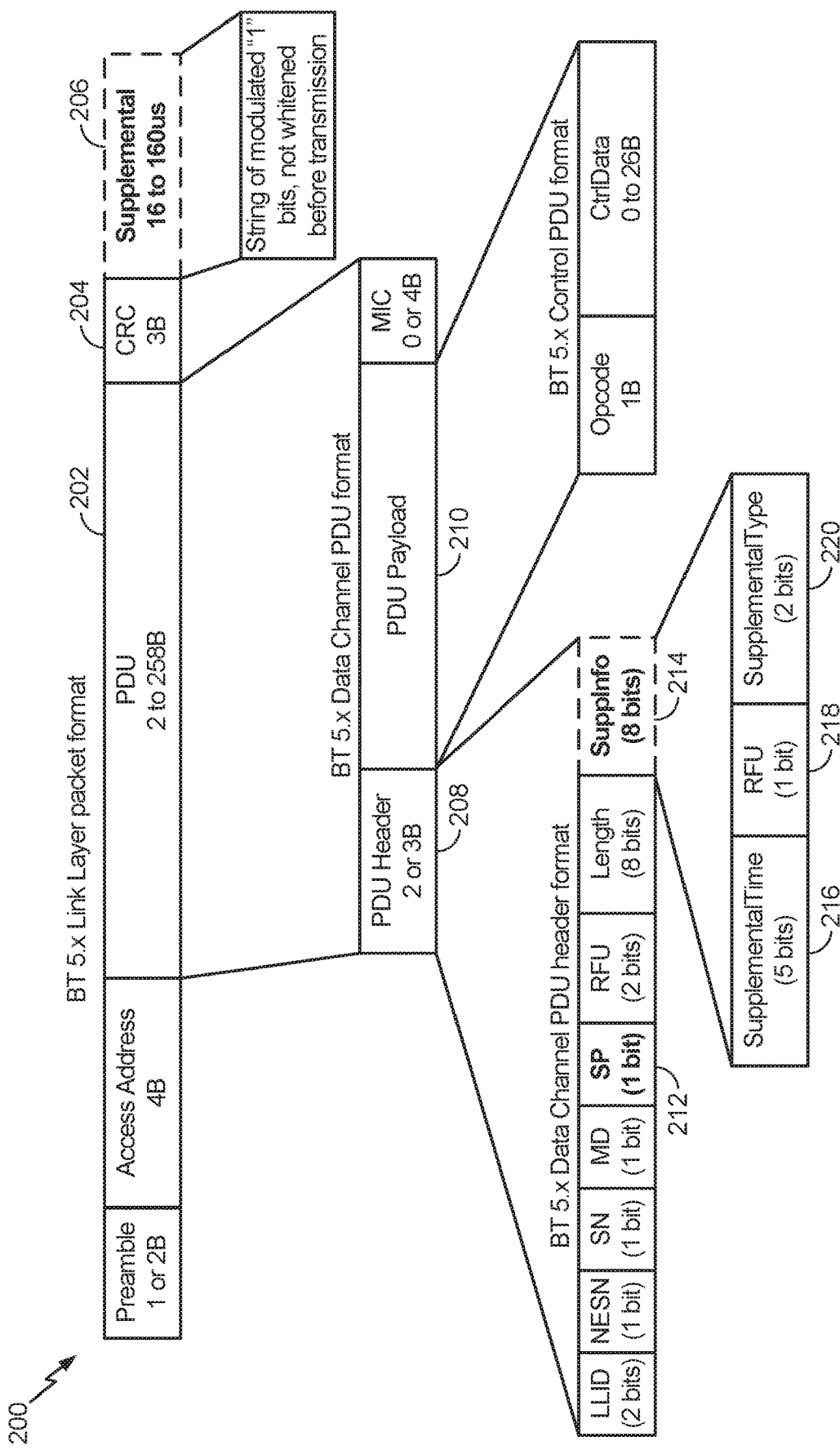
FIG. 2 illustrates an example structure for an angle of arrival (AoA) packet according to a first wireless communication system.

FIG. 2 illustrates an example structure for an angle of arrival (AoA) packet 200 according to a first wireless communication system. In one example, the structure of the AoA packet 200 is in conformance with a post-5.0 version of the Bluetooth Low Energy Link Layer. As shown in FIG. 2, the AoA packet 200 includes protocol data unit (PDU) field 202 followed by a cyclic redundancy check (CRC) field 204. Also included in the AoA packet 200 is a supplemental field 206 located after the CRC field 204. In one example, the supplemental field 206 includes a string of modulated logic "1" bits. Also, when compared to the structure for the AoA packets 400 and 500, to be discussed below, the PDU header 208 is extended to include an SP field 212 as well as a supplemental information field 214. The SP field 212 may include an indicator bit to indicate the existence of the supplemental field 206. The supplemental information field 214 may include a supplemental time field 216, a reserved for future use (RFU) field 218, and a supplemental type field 220. The supplemental time field 216 may be configured to indicate a length of the supplemental field 206 and the supplemental type field 220 may be configured to indicate AoA or angle of departure (AoD).

Figure 3:
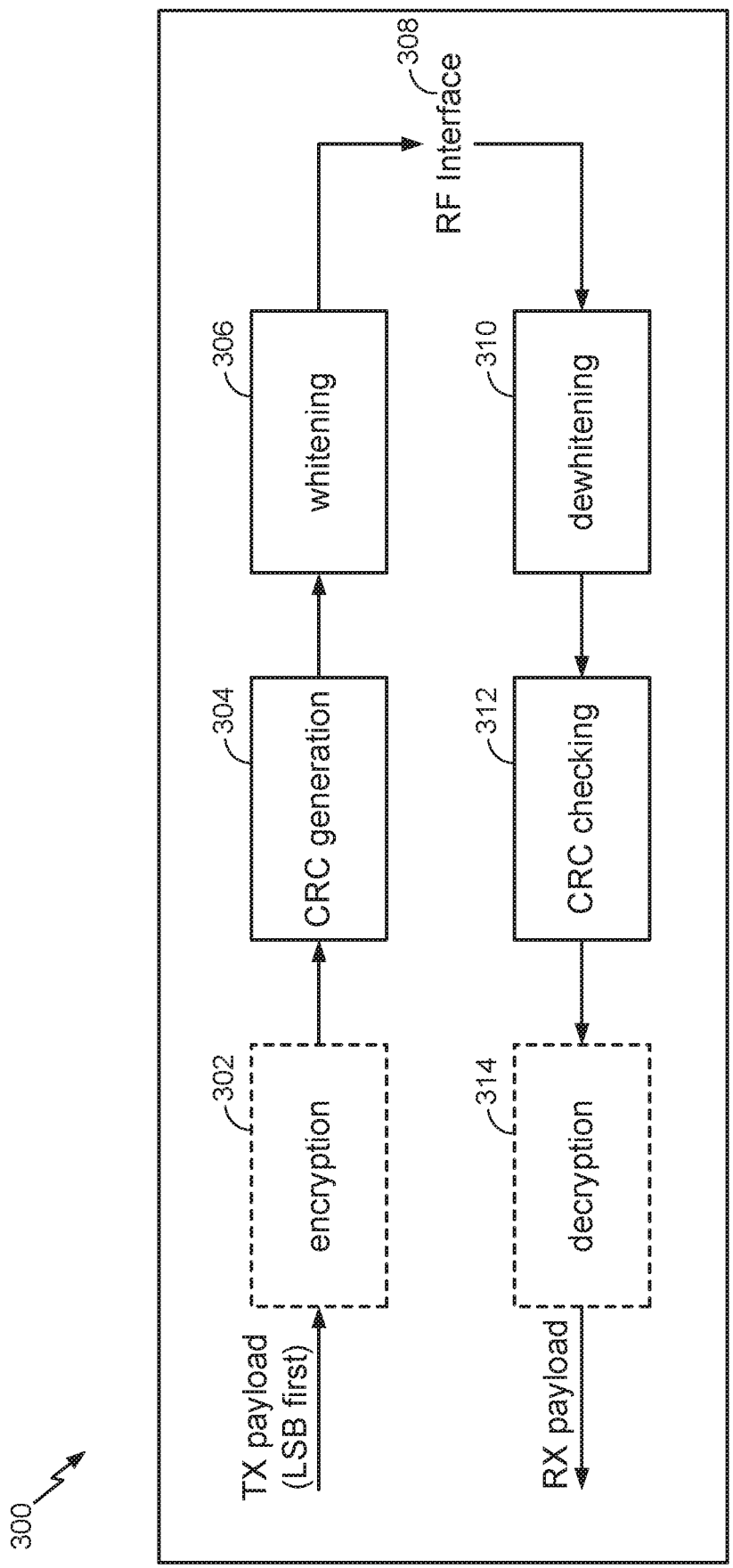
FIG. 3 illustrates an example process of transmitting and receiving of an AoA packet, according to aspects of the disclosure.

FIG. 3 illustrates an example process 300 of transmitting and receiving an AoA packet, according to aspects of the disclosure. Encryption block 302, CRC generation block 304, and whitening block 306 correspond to operations performed by a first wireless device, such as first wireless device 102 of FIG. 1, while dewhitening block 310, CRC checking block 312, and decryption block 314 correspond to operations performed by a second wireless device, such as second wireless device 104 of FIG. 1. The illustrated example of RF interface 308 corresponds to both the transmit operations performed by the Bluetooth transceiver 106 of the first wireless device 102, as well as the receive operations performed by the Bluetooth transceiver 114 of the second wireless device 104. The bits of an AoA packet (e.g., AoA packet 200) are transmitted over the air and modulated, as specified in a Bluetooth standard (e.g., Bluetooth 5.0) using a modem and a radio. The bit stream that is sent to the modem is pre-processed as shown by blocks 302-306. In one example, the PDU payload 210 is optionally encrypted via encryption block 302. CRC generation block 304 adds the CRC field 204. The CRC field 204 may correspond to a CRC of the entire PDU payload 210. The bit stream is then whitened (i.e., randomized) before being transmitted via the RF interface 308. In one example, the entire PDU payload 210 is encrypted and whitened, but the supplemental field 206 is neither encrypted or whitened prior to transmission of the AoA packet 200. That is, the supplemental field 206 is only modulated by the modem, resulting in a continuous waveform transmitted over the radio.

A reverse process is performed by the second wireless device 104 after reception of the AoA packet 200. For example, the entire PDU payload 210 is dewhitened via dewhitening block 310, CRC checking is performed utilizing the CRC field 204 by CRC checking block 312, and decryption of the PDU payload 210 is performed by the decryption block 314.

While receiving the supplemental field 206 of the AoA packet 200, the second wireless device 104 may switch between the antennas 110A-110D and capture in-phase and quadrature (I&Q) samples instead of demodulating the data after the CRC. The I&Q samples can then be utilized by the AoA estimation block 116 to calculate a phase difference in the radio signal received using different antennas 110A-110D of the antenna array, which in turn is used to estimate the AoA 112.

As shown above, the structure of AoA packet 200 provides for a dedicated supplemental field 206 that is outside of the PDU field 202. The structure of AoA packet 200 also provides for dedicated SP and supplemental information fields 212 and 214 that are included in the PDU header 208. However, other packet structures, such as those included in Bluetooth 4.0 and 4.1 do not provide for the supplemental field 206, nor do they provide for the dedicated SP and supplemental information fields 212 and 214.

Figure 4:
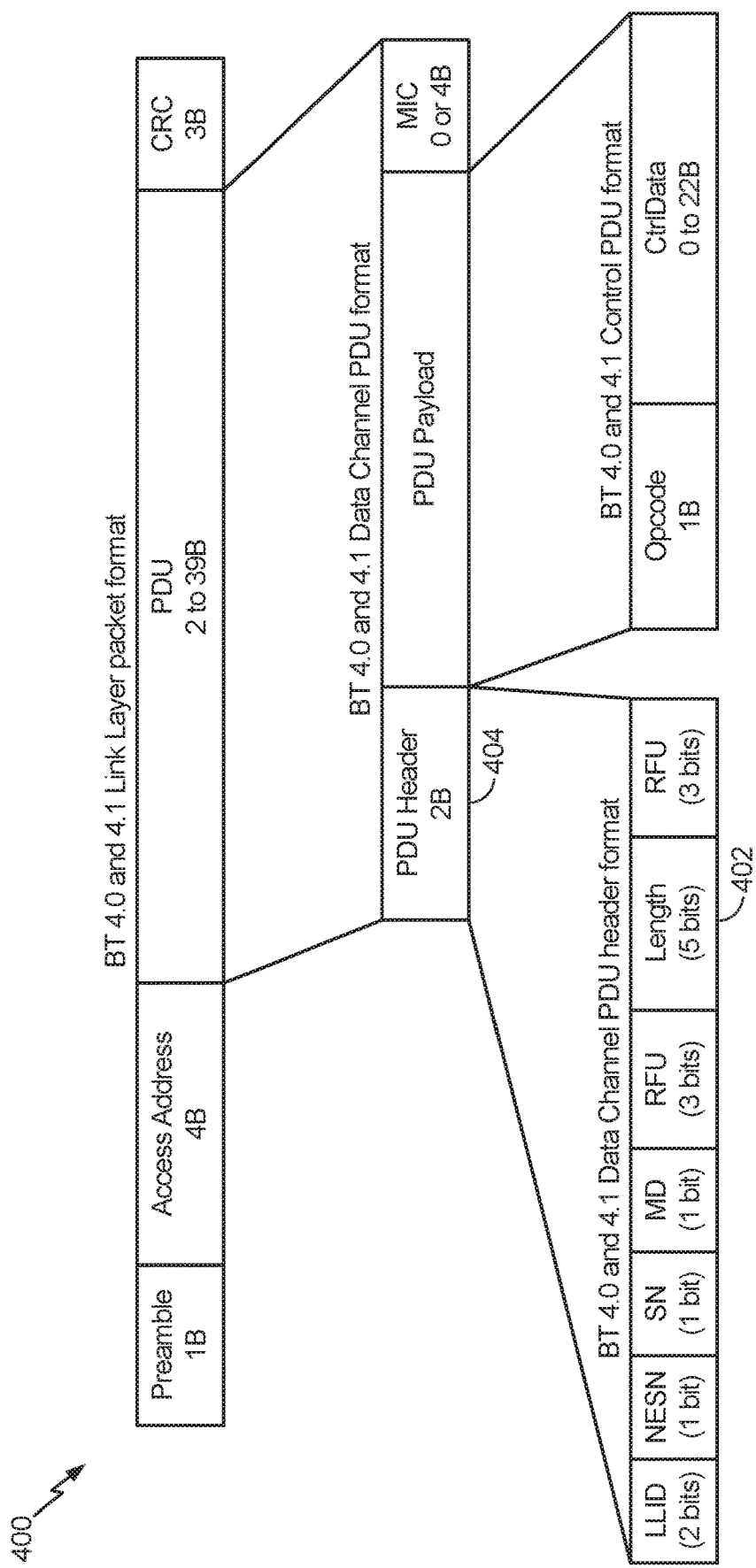
FIG. 4 illustrates an example structure for a packet according to a second wireless communication system.

For example, FIG. 4 illustrates a structure for a packet 400 according to a second wireless communication system. In one example, the structure of the packet 400 is in conformance with a 4.0 version of the Bluetooth Low Energy Link Layer. The structure of packet 400 is similar to the structure of packet 200 of FIG. 2. However, the structure of packet 400 does not provide for the supplemental field 206, nor does it include dedicated SP or supplemental information fields 212 and 214 in the PDU header 404. Furthermore, the length field 402 is shorter (i.e., 5 bits, max value 31) as compared to the length field of packet 200.

Figure 5:
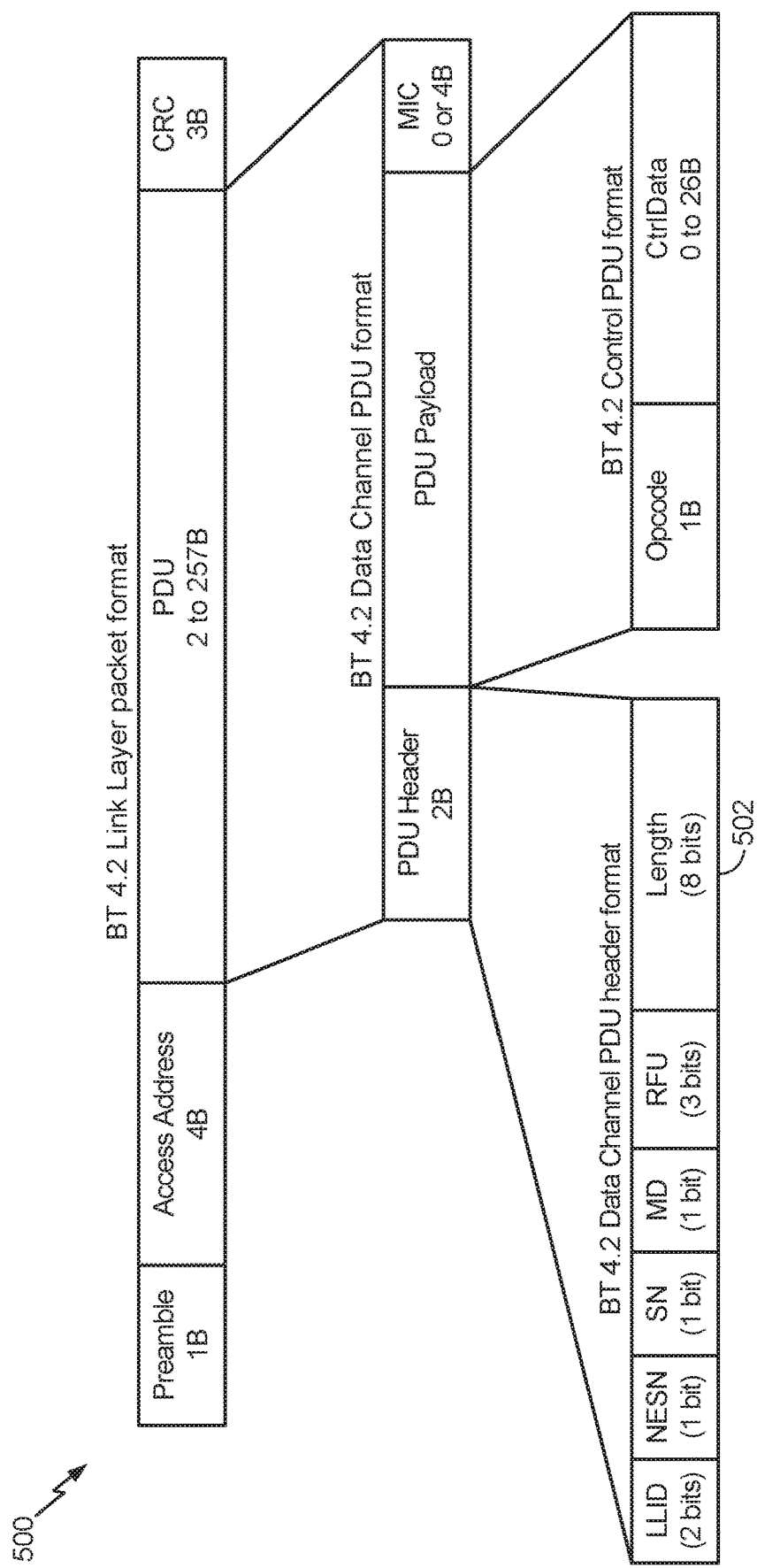
FIG. 5 illustrates an example structure for a packet according to a third wireless communication system.

By way of another example, FIG. 5 illustrates a structure for a packet 500 according to a third wireless communication system. In one example, the structure of the packet 500 is in conformance with a 4.1 version of the Bluetooth Low Energy Link Layer. The structure of packet 500 is similar to the structure of packet 400 of FIG. 4. The length field 502 is increased to 8 bits, allowing a maximum PDU size of 257. However, the structure of packet 500 also does not provide for the supplemental field 206, nor does it include dedicated SP or supplemental information fields 212 and 214 in the PDU header 404.

Many wireless devices that employ Bluetooth utilize the packet structure shown above in FIGS. 4 and 5. That is, many, if not a majority, of existing wireless devices include Bluetooth transceivers that do not support the transmitting of AoA packet 200 that includes the supplemental field 206. Accordingly, aspects of the present disclosure include a modified packet structure that may be used to mimic the AoA functionality of AoA packet 200. In one example, a modified packet structure is based on the structure of packet 400 and/or the structure of packet 500 (i.e., Bluetooth version 4.x).

Figure 6:
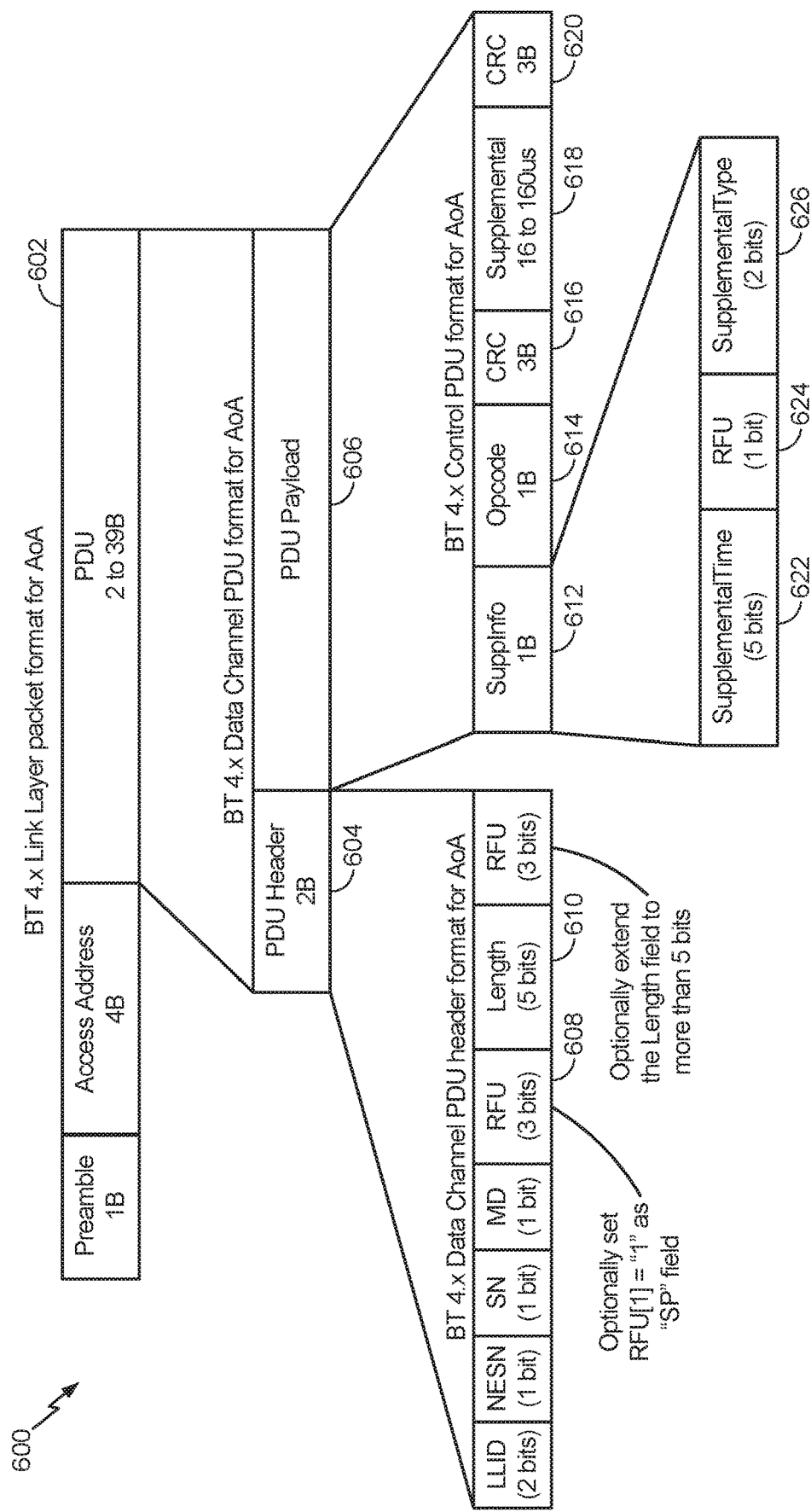
FIG. 6 illustrates an example structure for a modified AoA packet, according to aspects of the disclosure.

FIG. 6 illustrates an example structure for a modified AoA packet 600, according to aspects of the disclosure. As shown in FIG. 6, the AoA packet 600 includes a protocol data unit (PDU) field 602. Included in the PDU field 602 is a PDU header 604 and a corresponding PDU payload 606. The PDU payload 606 is modified to include a supplemental field 618. The supplemental field 618 is similar to supplemental field 206 discussed above, but rather than being a dedicated field outside of the PDU, the structure of modified AoA packet 600 incorporates the supplemental field 618 into the PDU payload 606 itself. The supplemental field 618 may include a string of bits having the same logic state (e.g., logic "1").

Furthermore, the PDU payload 606 may optionally be further modified to include a supplemental information field 612, an opcode field 614, and a CRC field 616. The supplemental information field 612 is similar to the supplemental information field 214 of packet 200, but rather than being a dedicated field within the PDU header, the structure of modified AoA packet 600 incorporates the supplemental information field 612 into the PDU payload 606, itself. The opcode field 614 may indicate whether the AoA packet 600 is a response to a request from another device for the AoA packet 600. For example, the opcode field 614 may indicate LL_SUPPLEMENTAL_REQ or, alternatively, a proprietary opcode. The CRC field 616 corresponds to a CRC from an end of the PDU header 604, through the supplemental information field 612 to an end of the opcode field 614. Further included in the PDU payload 606 is a second CRC field 620, which corresponds to a CRC of the entire PDU payload 606.

Included in the supplemental information field 612, is a supplemental time field 622, an RFU field 624, and a supplemental type field 626. In one aspect, the supplemental information field 612 is representative of a length of the supplemental field 618 included in the PDU payload 606.

In some aspects, the PDU header 604 of AoA packet 600 may optionally be modified. That is, the PDU header 604 may be modified to indicate that the PDU payload 606 includes the supplemental field 618. By way of example, the PDU header 604 may be modified to include an SP bit in place of the RFU field 608. The SP bit of the RFU field 608 may indicate that the PDU payload 606 includes the supplemental field 618. Furthermore, the length field 610 may optionally be extended to more than 5 bits.

Accordingly, the structure of modified AoA packet 600 may allow a pre-5.1 version Bluetooth transceiver (e.g., Bluetooth 4.x) to transmit an AoA packet 600 that contains the Bluetooth 5.1 version functionality of enabling AoA measurements by way of supplemental field 618.

Figure 7:
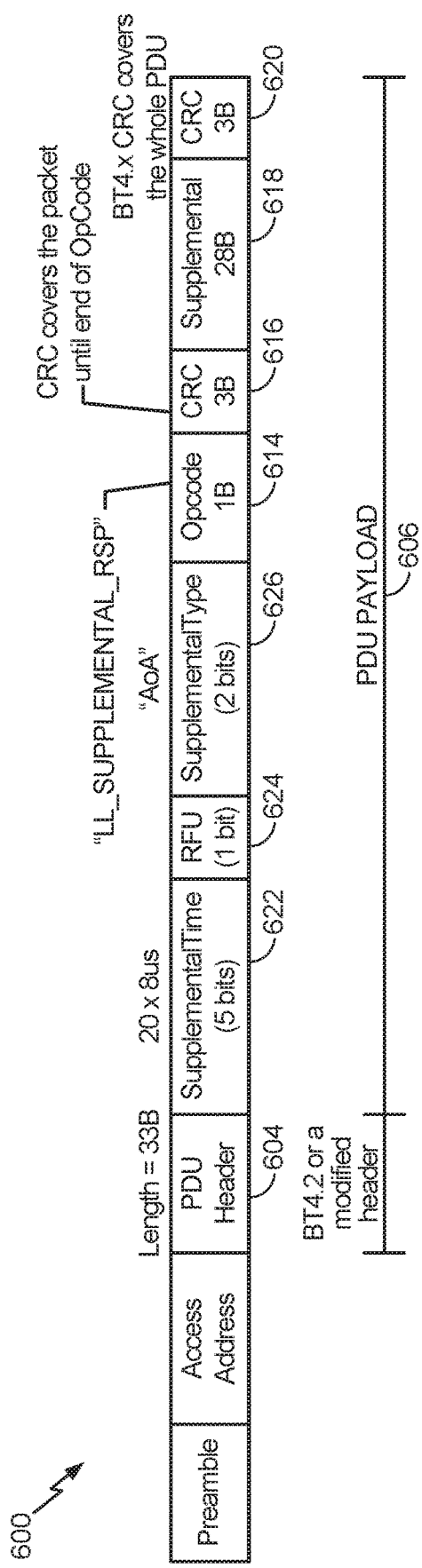
FIG. 7 illustrates an example structure for a modified AoA packet, generated by a wireless device, according to aspects of the disclosure.

FIG. 7 illustrates an example structure for the modified AoA packet 600, generated by a wireless device (e.g., first wireless device 102 of FIG. 1), according to aspects of the disclosure. The example modified AoA packet 600 is a modified Bluetooth 4.2 packet with an 8-bit length field transmitted as an AoA packet. As shown, the PDU header 604 indicates a length of 33 Bytes. The Supplemental Time field 622 indicates a 160 ρs long supplemental field 618. The total PDU length is 36 Bytes including the CRC field 620 at the end. As will be discussed below, encryption and whitenening may be turned off before transmission of the supplemental field 618. That is, encryption and/or whitening may be turned off for the entire PDU payload 606, or encryption and/or whitening may be turned off only for the supplemental field 618 such that a portion of the PDU payload 606 is encrypted and/or whitened while the supplemental field 618 remains un-encrypted and/or un-whitened.

It is recognized that the process of whitening and un-whitening may be the same process in Bluetooth (e.g., data XOR scrambling bit sequence). Thus, in one example, the supplemental field 618 is whitened when it is inserted into the PDU payload 606, where a subsequent whitening of the entire PDU payload 606 is performed prior to transmission of the AoA packet 600. Thus, the subsequent whitening of the entire PDU payload 606 will remove the previous whitening of the supplemental field 618 only.

Figure 8:
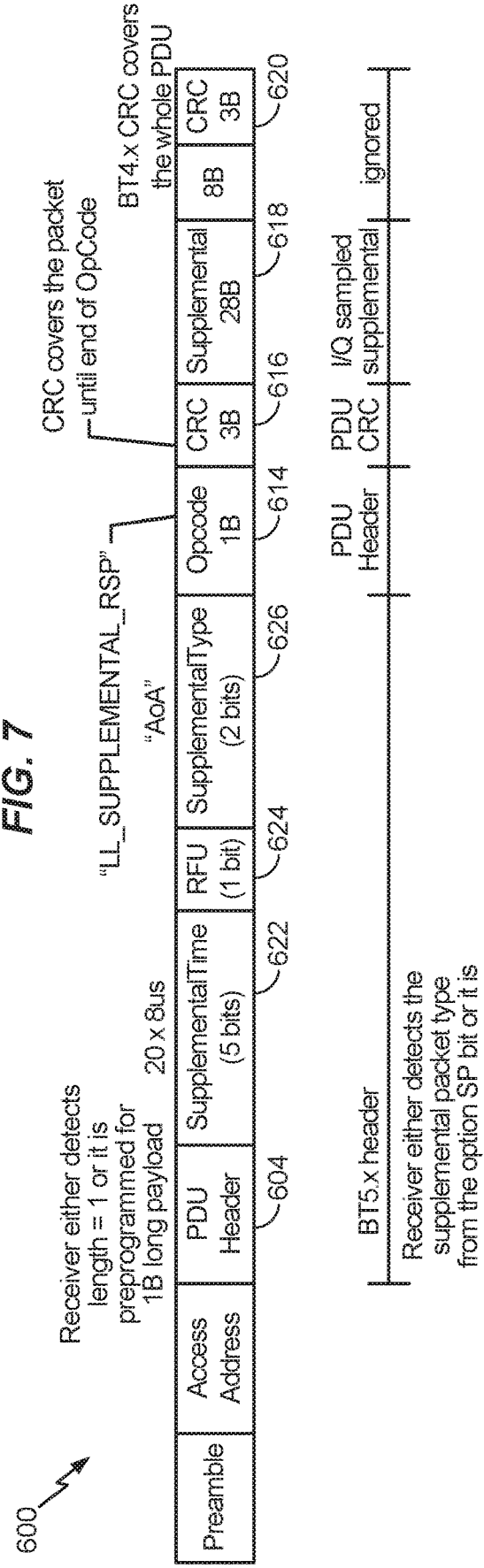
FIG. 8 illustrates the example structure for a modified AoA packet of FIG. 7, as received and processed by a wireless device, according to aspects of the disclosure.

FIG. 8 illustrates the example structure for a modified AoA packet of FIG. 7, as received and processed by a wireless device (e.g., second wireless device 104 of FIG. 1), according to aspects of the disclosure.

In one example, the second wireless device 104 is pre-programmed to turn off decryption and/or de-whitening at least during reception of the supplemental field 618. The PDU length may be pre-programmed to a predetermined length (e.g., 1 Byte) or the second wireless device 104 may be configured to detect the PDU length from the PDU header 604 (e.g., length field 610), such that only a lower portion (e.g., lower 5 bits) of the length field 610 are used. The Bluetooth transceiver 114 is configured to capture and demodulate the PDU payload 606 until an end of the first CRC field 616, where the Bluetooth transceiver 114 then turns on I&Q sampling during the reception of the supplemental field 618 as with a packet that was transmitted according to the structure of packet 200 (e.g., as if the AoA packet 600 was transmitted with a Bluetooth 5.1 transmitter).

In one aspect, the Bluetooth transceiver 114 of the second wireless device 104 may be configured to stop prior to the end of the AoA packet 600. For example, the Bluetooth transceiver 114 may stop 11 Byte durations before the end of AoA packet 600 because the maximum value (e.g., 20) of the Supplemental time field 622 as per Bluetooth 5.1 was used in the AoA packet 600. That is, using a larger value for the Supplemental time field 622, or using a smaller value for the length field 610, the transmitted and received versions of the AoA packet 600 can end at the same time. In this case, the final CRC field 620 may be omitted from the I/Q sample capture by Bluetooth transceiver 114.

Figure 9:
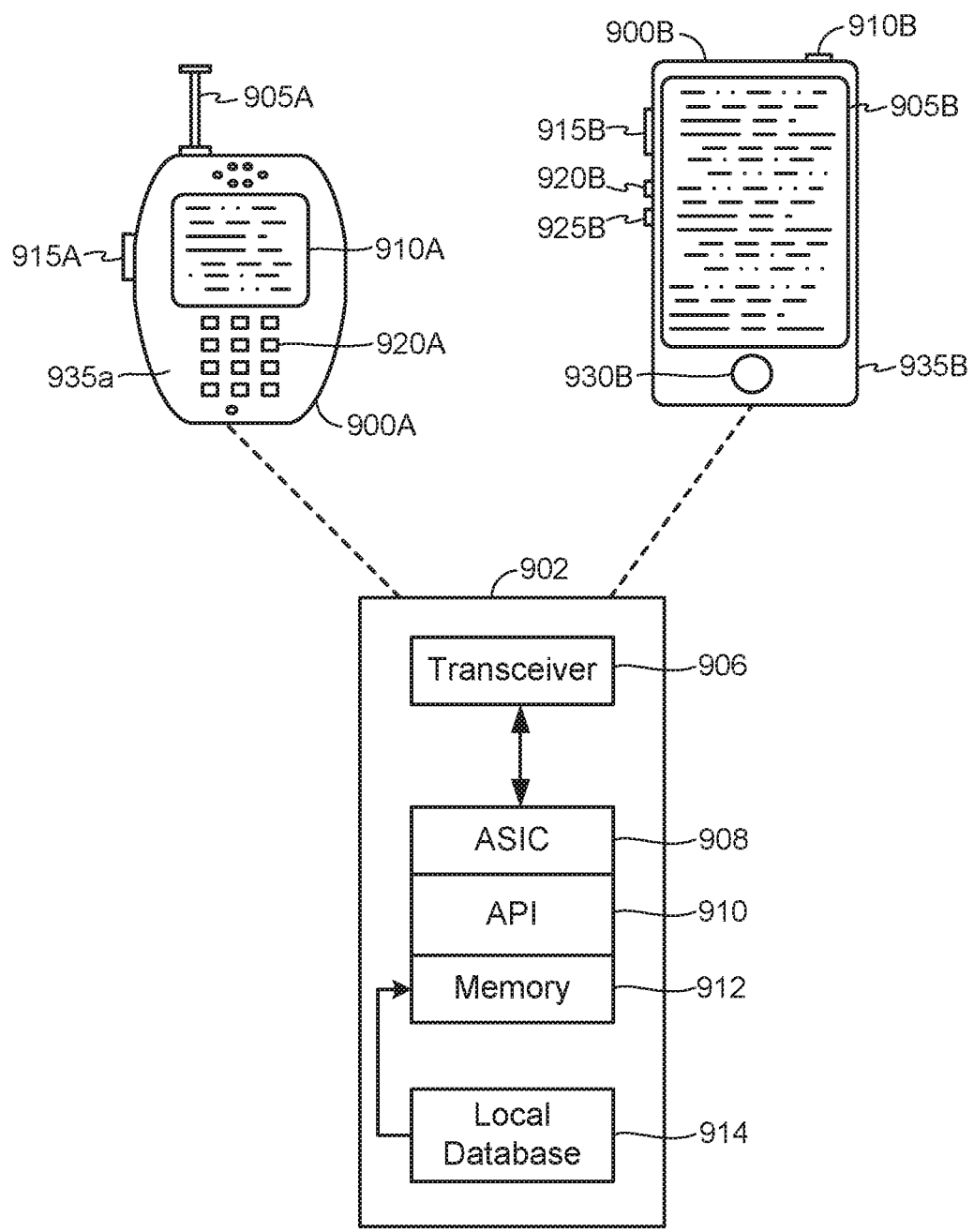
FIG. 9 illustrates example wireless devices, according to aspects of the disclosure.

FIG. 9 illustrates example wireless devices 900A and 900B, according to aspects of the disclosure. In some examples, wireless devices 900A and 900B may herein be referred to as wireless mobile stations. Wireless devices 900A and 900B are possible implementations of the first wireless device 102 and/or the second wireless device 104 of FIG. 1. The example wireless device 900A is illustrated in FIG. 9 as a calling telephone and wireless device 900B is illustrated as a touchscreen device (e.g., a smart phone, a tablet computer, etc.). As shown in FIG. 9, an exterior housing 935A of wireless device 900A is configured with at least one antenna 905A, display 910A, at least one button 915A (e.g., a PTT button, a power button, a volume control button, etc.) and keypad 920A among other components, not shown in FIG. 9 for clarity. An exterior housing 935B of wireless device 900B is configured with touchscreen display 905B, peripheral buttons 910B, 915B, 920B and 925B (e.g., a power control button, a volume or vibrate control button, an airplane mode toggle button, etc.), at least one front-panel button 930B (e.g., a Home button, etc.), among other components, not shown in FIG. 9 for clarity. For example, while not shown explicitly as part of wireless device 900B, wireless device 900B may include one or more external antennas and/or one or more integrated antennas that are built into the exterior housing 935B of wireless device 900B, including but not limited to Bluetooth Antennas, WiFi antennas, cellular antennas, satellite position system (SPS) antennas (e.g., global positioning system (GPS) antennas), and so on.

While internal components of wireless devices such as the wireless devices 900A and 900B can be embodied with different hardware configurations, a basic high-level configuration for internal hardware components is shown as platform 902 in FIG. 9. Platform 902 can receive and execute software applications, data and/or commands transmitted from a radio access network (RAN) that may ultimately come from a core network, the Internet and/or other remote servers and networks (e.g., an application server, web URLs, etc.). Platform 902 can also independently execute locally stored applications without RAN interaction. Platform 902 can include a transceiver 906 operably coupled to an application specific integrated circuit (ASIC) 908, or other processor, microprocessor, logic circuit, or other data processing device. ASIC 908 or other processor executes an application programming interface (API) 910 layer that interfaces with any resident programs in a memory 912 of the wireless device. Memory 912 can be comprised of read-only or random-access memory (RAM and ROM), EEPROM, flash cards, or any memory common to computer platforms. Platform 902 also can include a local database 914 that can store applications not actively used in memory 912, as well as other data. Local database 914 is typically a flash memory cell, but can be any secondary storage device as known in the art, such as magnetic media, EEPROM, optical media, tape, soft or hard disk, or the like.

In one aspect, wireless communications by wireless devices 900A and 900B may be enabled by the transceiver 906 based on different technologies, such as CDMA, W-CDMA, time division multiple access (TDMA), frequency division multiple access (FDMA), Orthogonal Frequency Division Multiplexing (OFDM), GSM, 2G, 3G, 4G, LTE, Bluetooth, or other protocols that may be used in a wireless communications network or a data communications network. Voice transmission and/or data can be transmitted to the electronic devices from a RAN using a variety of networks and configurations. Accordingly, the illustrations provided herein are not intended to limit the aspects of the invention and are merely to aid in the description of aspects of aspects of the invention.

Accordingly, aspects of the present disclosure can include a wireless device (e.g., wireless devices 900A, 900B, etc.) configured, and including the ability to perform the functions as described herein. For example, transceiver 906 may be implemented as Bluetooth transceiver 114 and/or Bluetooth transceiver 106 of FIG. 1. Furthermore, memory 912 may be adapted to store program code, where a processor, such as ASIC 908 is coupled to the memory 912 at access and execute instructions included in the program code. The instructions included in the program code may be configured to direct the platform 902 to generate and/or receive an AoA packet, such as AoA packet 600 of FIG. 6. Further operations to be performed by the platform 902 will be described in further detail with regards to process 1000 of FIG. 10 and process 1100 of FIG. 11.

As will be appreciated by those skilled in the art, the various logic elements can be embodied in discrete elements, software modules executed on a processor or any combination of software and hardware to achieve the functionality disclosed herein. For example, ASIC 908, memory 912, API 910 and local database 914 may all be used cooperatively to load, store and execute the various functions disclosed herein and thus the logic to perform these functions may be distributed over various elements. Alternatively, the functionality could be incorporated into one discrete component. Therefore, the features of the wireless devices 900A and 900B in FIG. 9 are to be considered merely illustrative and the invention is not limited to the illustrated features or arrangement.

Figure 10:
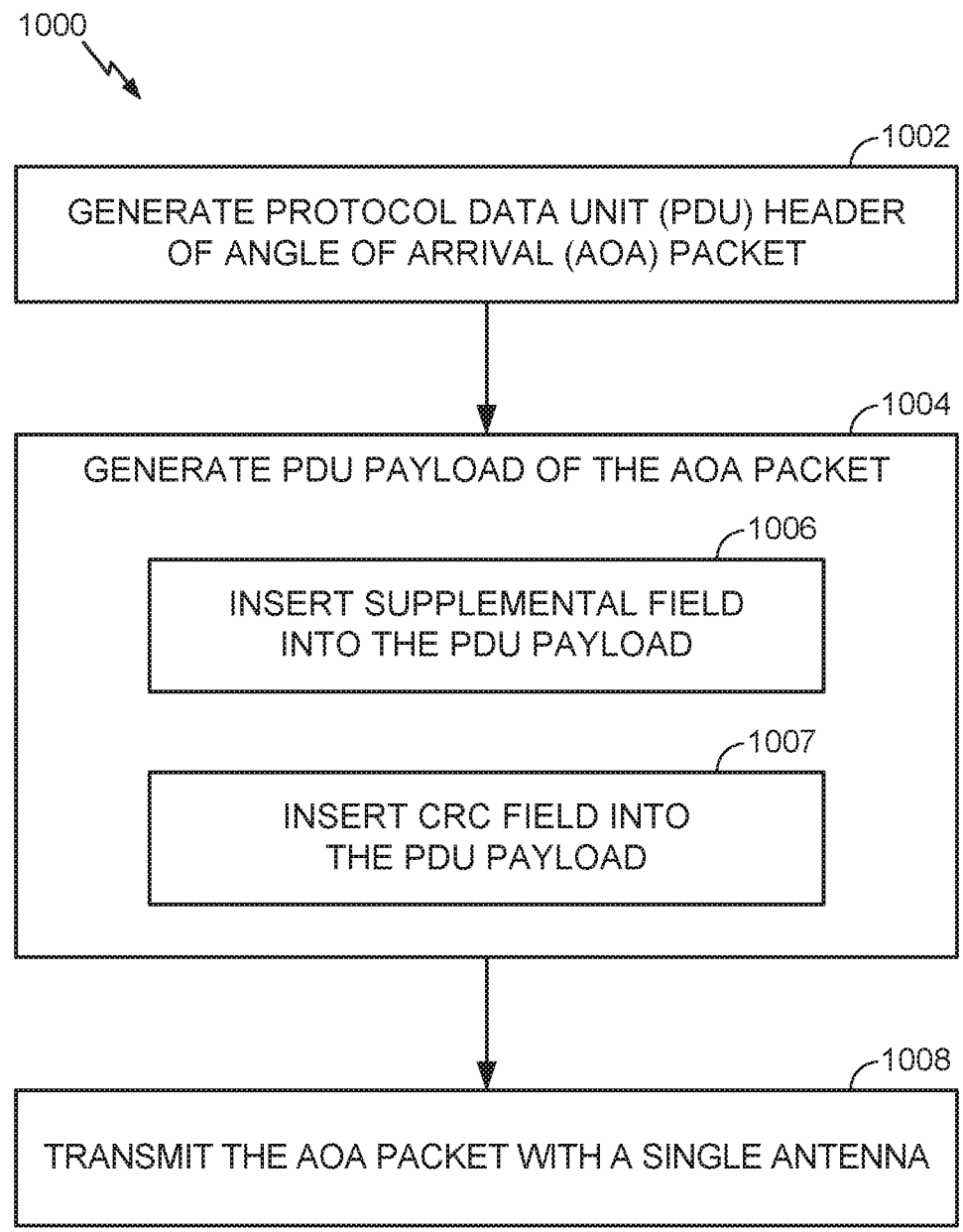
FIG. 10 illustrates an example process of wireless communication by a wireless device that includes generating an AoA packet, according to aspects of the disclosure.

FIG. 10 illustrates an example process 1000 of wireless communication by a wireless device that includes generating an AoA packet 600, according to aspects of the disclosure. Process 1000 is an example process capable of being performed by at least the first wireless device 102 of FIG. 1. In one example, the Bluetooth transceiver 106 of the first wireless device 102 is a Bluetooth 4.1 transceiver that does not support the generation of an AoA packet according to the structure of AoA packet 200 of FIG. 2.

Accordingly, the Bluetooth transceiver 106 may be configured to generate a modified AoA packet 600, such as that described above with reference to FIG. 6. For example, in a process block 1002, the Bluetooth transceiver 106 generates a PDU header 604 of an AoA packet 600. In one aspect, generating the PDU header 604 includes modifying the PDU header 604 to indicate that the PDU payload 606 includes the supplemental field 618. Modifying the PDU header 604 to indicate that the PDU payload 606 includes the supplemental field 618 may include replacing or setting one or more reserved bits of the RFU field 608 with one or more bits (e.g., SP bit).

Next, in a process block 1004, the Bluetooth transceiver 106 generates the PDU payload 606 of the AoA packet 600. Generating the PDU payload 606 of the AoA packet 600 includes inserting the supplemental field 618 into the PDU payload 606 (e.g., process block 1006). As discussed above, the supplemental field 618 may include a string of bits having the same logic state (e.g., logic "1"). Generating the PDU payload 606 also includes inserting the CRC field 616 into the PDU payload 606 (e.g., process block 1007), where the CRC field 616 corresponds to a CRC of at least the supplemental field 618.

Optionally, process block 1004 may further include inserting one or more additional fields into the PDU payload 606. For example, the Bluetooth transceiver 106 may insert a supplemental information field 612 into the PDU payload, where the supplemental information field 612 may include the supplemental time field 622, the RFU field 624, and/or the supplemental type field 626. Process block 1004 may also include inserting the opcode field 614 into the PDU payload 606, where the opcode field 614 indicates whether the AoA packet 600 is a response to a request from another wireless device (e.g., second wireless device 104). In one example, the CRC field 616 corresponds to a CRC from an end of the PDU header 604, through the supplemental information field 612 to an end of the opcode field 614. Lastly, process block 1004 may include inserting a second CRC field 620 that corresponds to a CRC of the entire PDU payload 606.

Next, in process block 1008, the first wireless device 102 transmits the AoA packet 600 with the single transmitting antenna 108. As discussed above, transmitting the AoA packet 600 may include transmitting the AoA packet 600 without encrypting the supplemental field 618. That is, the entire PDU payload 606 may be un-encrypted, or alternatively, a portion of the PDU payload 606 may be encrypted without encrypting the supplemental field 618. Similarly, transmitting the AoA packet 600 may include transmitting the AoA packet 600 without randomizing the supplemental field 618. That is, the entire PDU payload 606 may be un-whitened, or alternatively, a portion of the PDU payload 606 may be whitened without whitening the supplemental field 618. Even still, the supplemental field 618 may be whitened when inserted into the PDU payload 606, where a subsequent whitening of the entire PDU payload 606 is performed prior to transmission to remove the previous whitening of the supplemental field 618.

Figure 11:
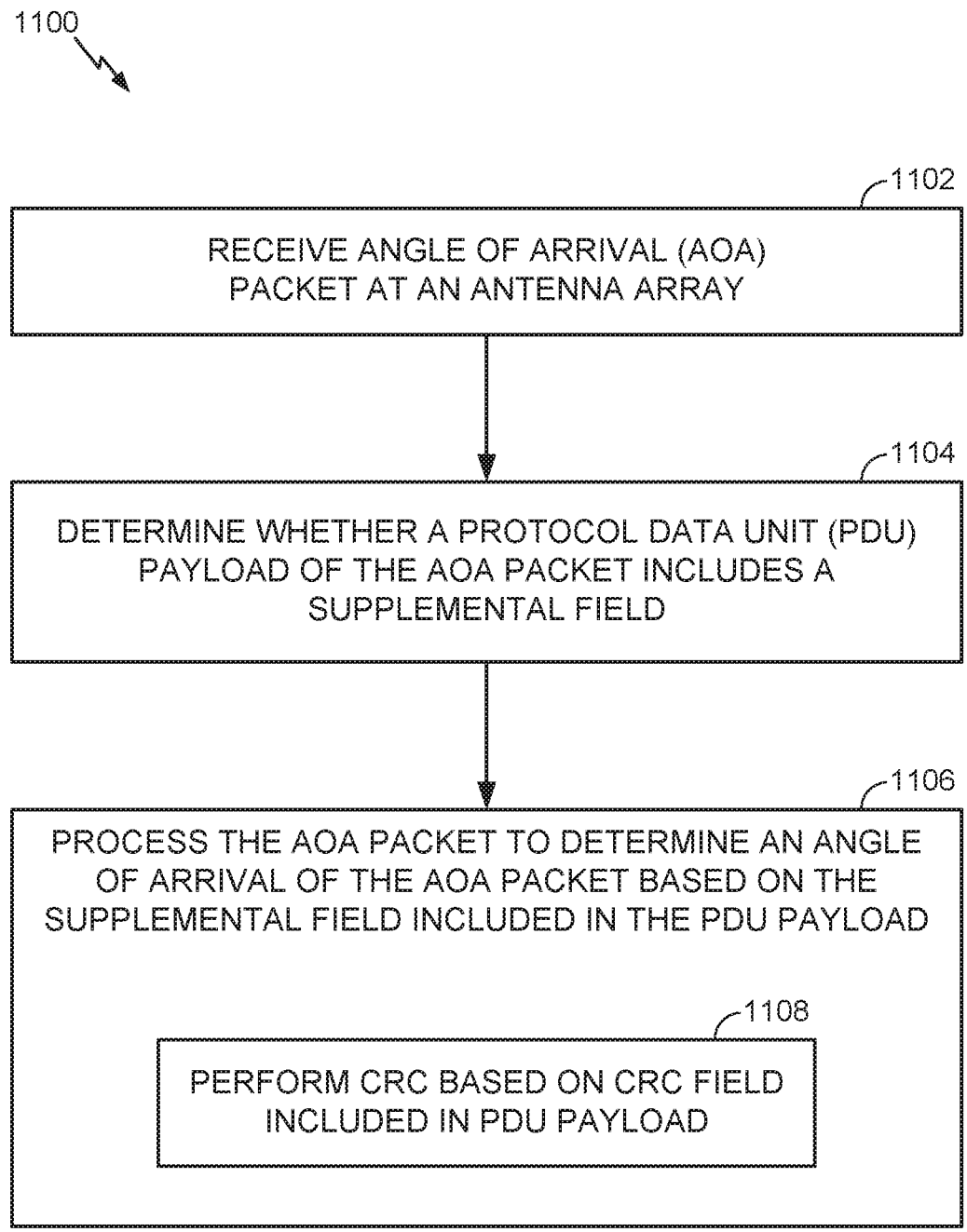
FIG. 11 illustrates an example process of wireless communication by a wireless device that includes receiving an AoA packet, according to aspects of the disclosure.

FIG. 11 illustrates an example process 1100 of wireless communication by a wireless device that includes receiving an AoA packet 600, according to aspects of the disclosure. Process 1100 is an example process capable of being performed by at least the second wireless device 104 of FIG. 1. In one example, the Bluetooth transceiver 114 of the second wireless device 104 is a Bluetooth 5.1 transceiver that supports the processing of an AoA packet according to the structure of AoA packet 200 of FIG. 2. However, Bluetooth transceiver 114 may also be configured to support the processing of an AoA packet according to the structure of AoA packet 600 of FIG. 6 that is generated by a Bluetooth transceiver that is not Bluetooth 5.1 compliant.

For example, in process block 1102, Bluetooth transceiver 114 receives an AoA packet 600 at an antenna array (e.g., antennas 110A-D) from the first wireless device 102. Next, in process block 1104, the second wireless device 104 determines whether the PDU payload 606 of AoA packet 600 includes the supplemental field 618. In one aspect, the second wireless device 104 may be assume that all AoA packets 600 received have the supplemental field 618 in the PDU payload 606. In another example, the second wireless device 104 may be configured to dynamically detect whether the PDU payload 606 includes the supplemental field 618. For example, process block 1104 may include determining whether the PDU header 604 indicates whether the PDU payload 606 includes the supplemental field 618, by for example, inspecting (e.g., reading) one or more reserved bits in the RFU field 608. If the RFU field 608 indicates that the PDU payload 606 includes the supplemental field 618, process 1100 may proceed with the processing of the AoA packet 600 to determine the AoA 112 based on the supplemental field 618 included in the PDU payload 606 (i.e., process block 1106).

For example, process block 1106 may include reading the supplemental information field 612 to determine a length of the supplemental field (e.g., via supplemental time field 622), and/or may determine a type of the AoA packet 600 via the supplemental type field 626. Process block 1106 may further include reading an opcode included in the opcode field 614 to determine whether the AoA packet 600 is a response to a request for the AoA packet 600. Process block 1106 also includes performing a CRC check based on the CRC included in CRC field 616 (i.e., process block 1108). In addition to the CRC check performed based on CRC field 616, process block 1106 may include performing a second CRC check based on the CRC included in the CRC field 620.

As mentioned above, the AoA packet 600 may be transmitted with at least the supplemental field 618 un-encrypted. That is, a portion of the PDU payload 606 may be encrypted while the supplemental field 618 is received un-encrypted. Thus, the second wireless device 104 may be configured to decrypt the PDU payload 606 without decrypting the supplemental field 618. Similarly, the second wireless device 104 may be configured to de-whiten the PDU payload 606 without de-whitening the supplemental field 618.

Figure 12:
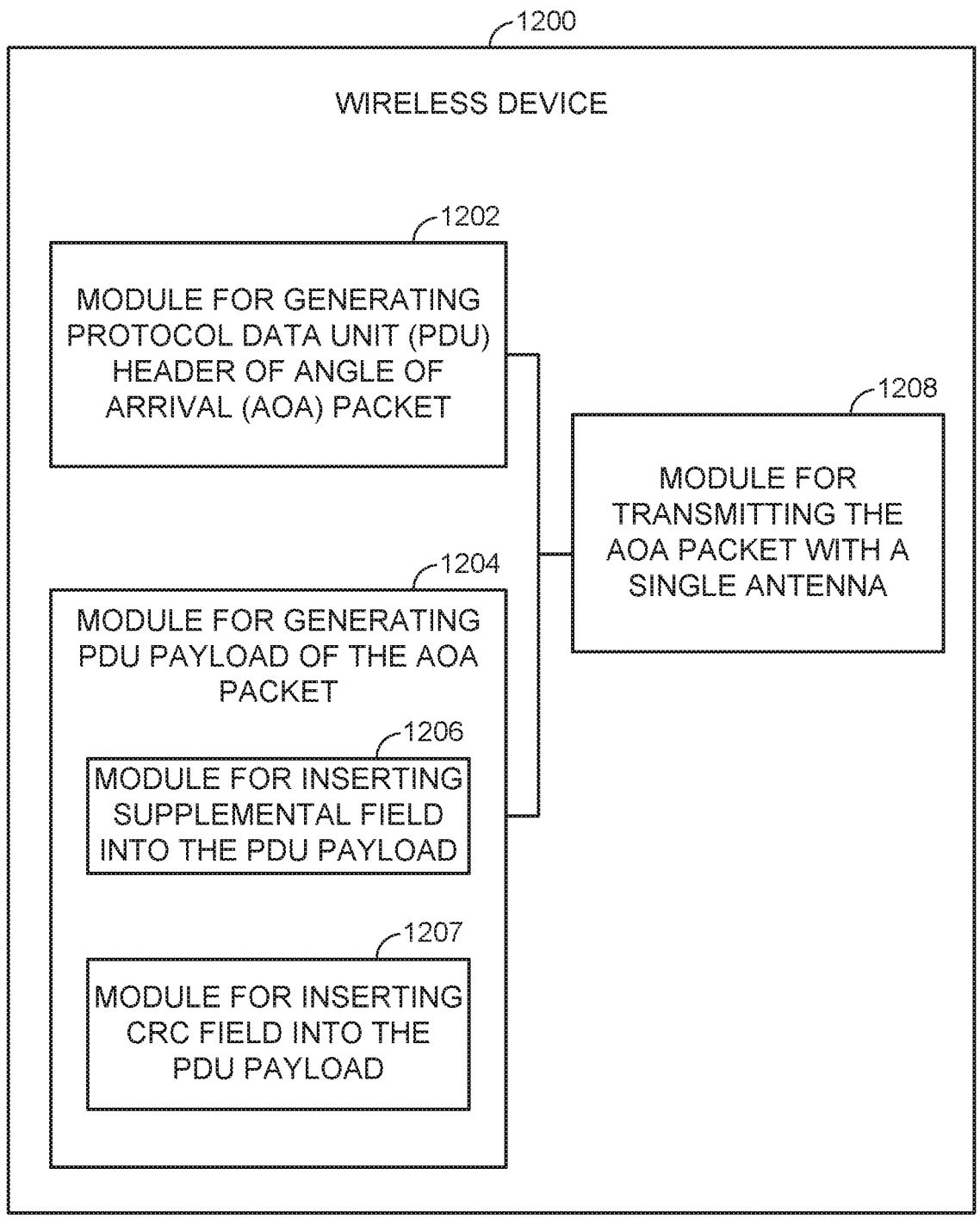
FIGS. 12 and 13 are simplified block diagrams of several sample aspects of wireless devices configured to support wireless communication as taught herein.

FIG. 12 illustrates an example wireless device 1200 represented as a series of interrelated functional modules. A module 1202 for generating a PDU header of an AoA packet 600 may correspond at least in some aspects to, for example, Bluetooth transceiver 106 of FIG. 1, transceiver 906 of FIG. 9, and/or ASIC 908 of FIG. 9 as discussed herein. A module 1204 for generating a PDU payload of the AoA packet may correspond at least in some aspects to, for example, transceiver 106 of FIG. 1, transceiver 906 of FIG. 9, and/or ASIC 908 of FIG. 9, as discussed herein. A module 1208 for transmitting the AoA packet with a single antenna may correspond at least in some aspects to, for example, transceiver 106 of FIG. 1, transceiver 906 of FIG. 9, and/or antenna 108 of FIG. 1, as discussed herein. As shown in FIG. 12, module 1204 may include a module 1206 for inserting a supplemental field into the PDU payload as well as a module 1207 for inserting the CRC field into the PDU payload of the AoA packet. Modules 1206 and 1207 may correspond at least in some aspects to, for example, transceiver 106 of FIG. 1, transceiver 906 of FIG. 9, and/or ASIC 908 of FIG. 9, as discussed herein.

Figure 13:
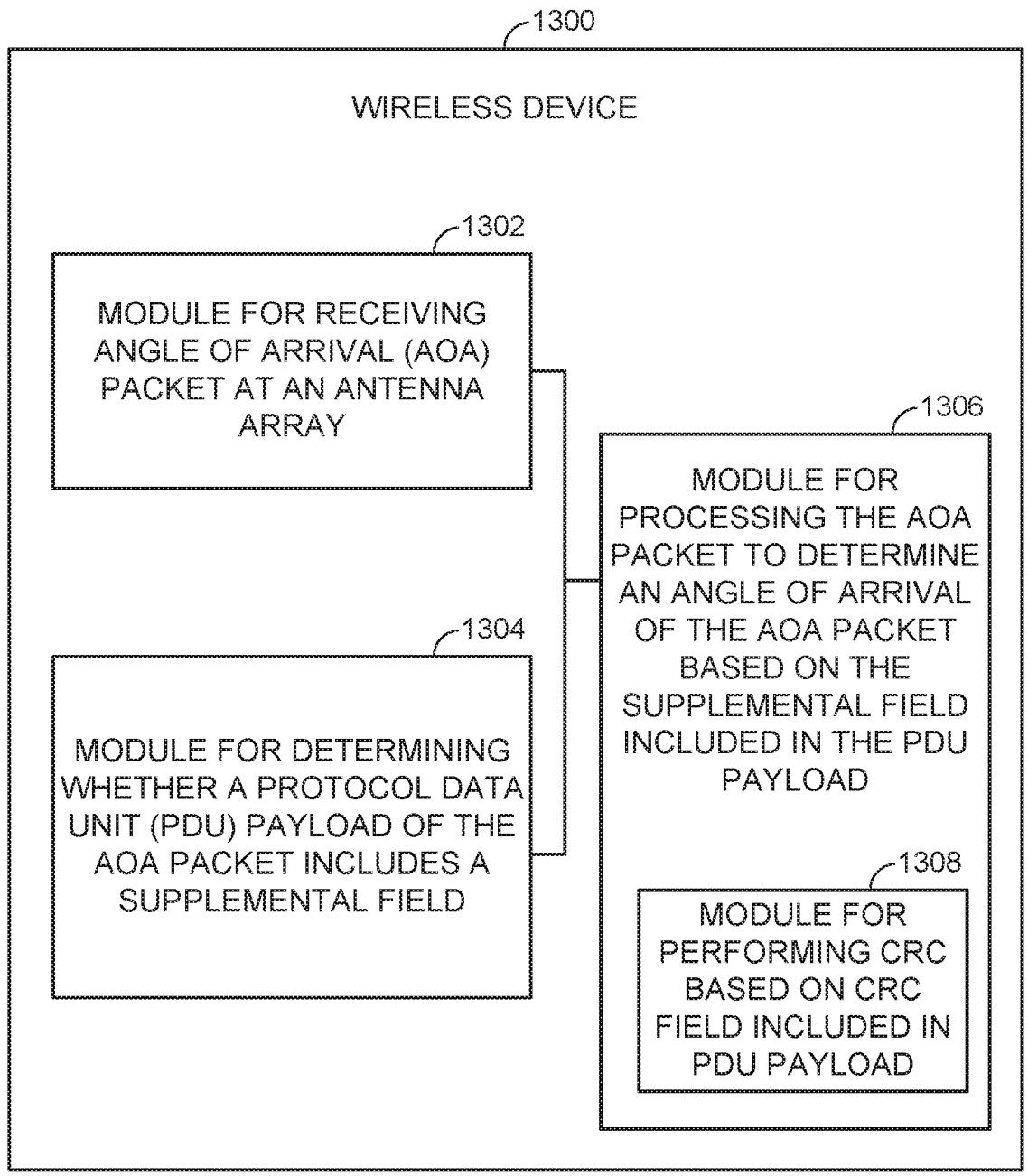

FIG. 13 illustrates an example wireless device 1300 represented as a series of interrelated functional modules. A module 1302 for receiving an AoA packet 600 at an antenna array may correspond at least in some aspects to, for example, transceiver 114 of FIG. 1, transceiver 906 of FIG. 9, and/or antennas 110A-D of FIG. 1, as discussed herein. A module 1304 for determining whether a PDU payload of the AoA packet includes a supplemental field may correspond at least in some aspects to, for example, a transceiver 114 of FIG. 1, transceiver 906 of FIG. 9, and/or ASIC 908 of FIG. 9, as discussed herein. A module 1306 for processing the AoA packet to determine an angle of arrival of the AoA packet based on the supplemental field included in the PDU payload may correspond at least in some aspects to, for example, transceiver 114 of FIG. 1, AoA estimation block 116, transceiver 906 of FIG. 9, and/or ASIC 908 of FIG. 9, as discussed herein. As shown in FIG. 13, module 1306 may include a module 1308 for performing a CRC based on the CRC field 616 included in the PDU payload 606. Module 1308 may correspond at least in some aspects to, for example, transceiver 114 of FIG. 1, AoA estimation block 116, transceiver 906 of FIG. 9, and/or ASIC 908 of FIG. 9, as discussed herein.

The functionality of the modules of FIGS. 12-13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 12-13, as well as other components and functions described herein, may be implemented using any suitable means. Such means also may be implemented, at least in part, using corresponding structure as taught herein. For example, the components described above in conjunction with the "module for" components of FIGS. 12-13 also may correspond to similarly designated "means for" functionality. Thus, in some aspects one or more of such means may be implemented using one or more of processor components, integrated circuits, or other suitable structure as taught herein.

Further, those of skill in the art will appreciate that the various illustrative logical blocks, modules, circuits, and algorithm steps described in connection with the aspects disclosed herein may be implemented as electronic hardware or a combination of computer software and electronic hardware. To clearly illustrate this interchangeability of hardware and hardware-software combinations, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a non-transitory computer-readable media embodying a method for generating and receiving an angle of arrival (AoA) packet in a wireless communication system, as taught herein. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of wireless communication by a wireless device, the method comprising:
   generating, by the wireless device, a protocol data unit (PDU) header of an angle of arrival (AoA) packet, wherein the PDU header includes a reserved for future use (RFU) field and is compliant with Bluetooth version 4.0, 4.1 or 4.2;
   generating, by the wireless device, a PDU payload of the AoA packet corresponding to the PDU header, wherein generating the PDU payload includes:
   inserting a supplemental field into the PDU payload to enable another wireless device to determine an angle of arrival of the AoA packet, the supplemental field comprising only a string of bits with identical logic states configured to generate a continuous waveform, and inserting a cyclic redundancy check (CRC) field into the PDU payload, the CRC field corresponding to a CRC of at least the supplemental field;
   modifying the PDU header by replacing one or more reserved bits of the RFU field to indicate that the PDU payload includes the supplemental field; and transmitting the AoA packet with a single antenna of the wireless device.

2. The method of claim 1, wherein generating the PDU payload of the AoA packet further comprises:
   inserting a supplemental information field into the PDU payload, wherein the supplemental information field includes at least one field selected from the group: a supplemental time field indicating a length of the supplemental field, a reserved field, and a supplemental type field.

3. The method of claim 1, wherein generating the PDU payload of the AoA packet further comprises:
   inserting an opcode into the PDU payload.

4. The method of claim 3, wherein the opcode indicates whether the AoA packet is a response to a request from the other wireless device for the AoA packet.

5. The method of claim 1, wherein generating the PDU payload of the AoA packet further comprises generating the PDU payload to include:
   a supplemental information field;
   an opcode;
   the CRC field, wherein the CRC field corresponds to a CRC from an end of a PDU header, through the supplemental information field, to an end of the opcode; and
   the supplemental field.

6. The method of claim 5, wherein generating the PDU payload of the AoA packet further comprises generating the PDU payload to include:
   a second CRC field corresponding to a CRC of the entire PDU payload.

7. The method of claim 1, further comprising transmitting the AoA packet without encrypting the supplemental field.

8. The method of claim 7, further comprising encrypting at least a portion of the PDU payload without encrypting the supplemental field.

9. The method of claim 1, further comprising transmitting the AoA packet without whitening the supplemental field.

10. The method of claim 9, further comprising whitening at least a portion of the PDU payload without whitening the supplemental field.

11. The method of claim 1, wherein inserting the supplemental field into the PDU payload includes whitening the supplemental field, the method further comprising:

whitening the entire PDU payload to remove the whitening of the supplemental field.

12. The method of claim 11, wherein the logic state is a logic "1".

13. The method of claim 1, wherein transmitting the AoA packet comprises transmitting the AoA packet with a Bluetooth transceiver of the wireless device.

14. A method of wireless communication by a wireless device, the method comprising:
  receiving, at an antenna array of the wireless device, an angle of arrival (AoA) packet from another wireless device, wherein the AoA packet includes a protocol data unit (PDU) payload and a corresponding PDU header, and wherein the PDU header includes a reserved for future use (RFU) field and is compliant with Bluetooth version 4.0, 4.1 or 4.2;
  determining whether a protocol data unit (PDU) payload of the AoA packet one or more reserved bits of the RFU field indicate that the PDU payload includes a supplemental field, the supplemental field comprising only a string of bits with identical logic states configured to generate a continuous waveform; and
  if so processing the AoA packet to determine an angle of arrival of the AoA packet based on the supplemental field included in the PDU payload, wherein processing the AoA packet comprises performing a cyclic redundancy check (CRC) based on a CRC field included in the PDU payload, the CRC field corresponding to a CRC of at least the supplemental field.

15. The method of claim 14, wherein processing the AoA packet further comprises:
  reading a supplemental information field included the PDU payload of the AoA packet, wherein the supplemental information field includes at least one field selected from the group of:
  a supplemental time field indicating a length of the supplemental field, a reserved field, and a supplemental type field.

16. The method of claim 14, wherein processing the AoA packet further comprises reading an opcode included the PDU payload of the AoA packet.

17. The method of claim 16, wherein the opcode indicates whether the AoA packet is a response to a request for the AoA packet sent to the other wireless device from the wireless device.

18. The method of claim 14, wherein the PDU payload of the AoA packet further comprises:
  a supplemental information field;
  an opcode;
  the CRC field, wherein the CRC field corresponds to a CRC from an end of a PDU header, through the supplemental information field, to an end of the opcode; and
  the supplemental field.

19. The method of claim 18, wherein the PDU payload of the AoA packet further comprises:
  a second CRC field corresponding to a CRC of the entire PDU payload.

20. The method of claim 14, wherein receiving the AoA packet includes receiving the PDU payload with the supplemental field un-encrypted.

21. The method of claim 20, wherein processing the AoA packet includes decrypting at least a portion of the PDU payload without decrypting the supplemental field.

22. The method of claim 14, wherein receiving the AoA packet includes receiving the PDU payload without the supplemental field whitened.

23. The method of claim 22, wherein processing the AoA packet includes de-whitening at least a portion of the PDU payload without de-whitening the supplemental field.

24. The method of claim 14, wherein the supplemental field comprises a string of bits having the same logic state.

25. The method of claim 24, wherein the logic state is a logic "1".

26. The method of claim 24, further comprising:
  switching among antennas of the antenna array while receiving the supplemental field of the PDU payload;
  capturing in-phase and quadrature (I&Q) samples of the supplemental field;
  calculating one or more phase differences based on the I&Q samples; and
  estimating the angle of arrival based on the one or more phase differences.

27. The method of claim 14, wherein receiving the AoA packet comprises receiving the AoA packet with a Bluetooth transceiver of the wireless device.

28. A wireless device, comprising:
  an antenna;
  a transceiver coupled to the antenna;
  memory adapted to store program code; and a processor coupled to the memory to access and execute instructions included in the program code to direct the wireless device to:
  generate a protocol data unit (PDU) header of an angle of arrival (AoA) packet, wherein the PDU header includes a reserved for future use (RFU) field and is compliant with Bluetooth version 4.0, 4.1 or 4.2;
  generate a PDU payload of the AoA packet corresponding to the PDU header, wherein the instructions to generate the PDU payload comprises instructions to:
  insert a supplemental field into the PDU payload to enable another wireless device to determine an angle of arrival of the AoA packet, the supplemental field comprising only a string of bits with identical logic states configured to generate a continuous waveform, and insert a cyclic redundancy check (CRC) field into the PDU payload, the CRC field corresponding to a CRC of at least the supplemental field;
  modify the PDU header by replacing one or more reserved bits of the RFU field to indicate that the PDU payload includes the supplemental field; and transmit the AoA packet with the antenna.

29. The wireless device of claim 28, wherein the instructions to generate the PDU payload of the AoA packet further comprise instructions to:
  insert a supplemental information field into the PDU payload, wherein the supplemental information field includes at least one field selected from the group: a supplemental time field indicating a length of the supplemental field, a reserved field, and a supplemental type field.

30. The wireless device of claim 28, wherein the instructions to generate the PDU payload of the AoA packet further comprise instructions to generate the PDU payload to include:
  a supplemental information field;
  an opcode;
  the CRC field, wherein the CRC field corresponds to a CRC from an end of a PDU header, through the supplemental information field, to an end of the opcode; and
  the supplemental field.

31. The wireless device of claim 30, wherein the instructions to generate the PDU payload of the AoA packet further comprise instructions to generate the PDU payload to include:
   a second CRC field corresponding to a CRC of the entire PDU payload.

32. The wireless device of claim 28, wherein the instructions to transmit the AoA packet comprise instructions to transmit the AoA packet without encrypting the supplemental field, the program code further comprising instructions to encrypt at least a portion of the PDU payload without encrypting the supplemental field.

33. The wireless device of claim 28, wherein the instructions to transmit the AoA packet comprise instructions to transmit the AoA packet without whitening the supplemental field, the program code further comprising instructions to whiten at least a portion of the PDU payload without whitening the supplemental field.

34. The wireless device of claim 28, wherein the instructions to insert the supplemental field into the PDU payload includes instructions to whiten the supplemental field and then whiten the entire PDU payload to remove the whitening of the supplemental field.

35. The wireless device of claim 28, wherein the transceiver comprises a Bluetooth transceiver.

36. A wireless device, comprising:
   an antenna array;
   a transceiver coupled to the antenna array;
   memory adapted to store program code; and a processor coupled to the memory to access and execute instructions included in the program code to direct the wireless device to:
   receive, at the antenna array, an angle of arrival (AoA) packet from another wireless device, wherein the AoA packet includes a protocol data unit (PDU) payload and a corresponding PDU header, and wherein the PDU header includes a reserved for future use (RFU) field and is compliant with Bluetooth version 4.0, 4.1 or 4.2;
   determine whether one or more reserved bits of the RFU field indicate that the PDU payload a protocol data unit (PDU) payload of the AoA packet includes a supplemental field, the supplemental field comprising only a string of bits with identical logic states configured to generate a continuous waveform; and
   if so process the AoA packet to determine an angle of arrival of the AoA packet based on the supplemental field included in the PDU payload, wherein the instructions to process the AoA packet comprises instructions to perform a cyclic redundancy check (CRC) based on a CRC field included in the PDU payload, the CRC field corresponding to a CRC of at least the supplemental field.

37. The wireless device of claim 36, wherein the instructions to process the AoA packet further comprise instructions to:
   read a supplemental information field included the PDU payload of the AoA packet, wherein the supplemental information field includes at least one field selected from the group of:
   a supplemental time field indicating a length of the supplemental field, a reserved field, and a supplemental type field.

38. The wireless device of claim 36, wherein the PDU payload of the AoA packet further comprises:
   a supplemental information field;
   an opcode;
   the CRC field, wherein the CRC field corresponds to a CRC from an end of a PDU header, through the supplemental information field, to an end of the opcode; and
   the supplemental field.

39. The wireless device of claim 38, wherein the PDU payload of the AoA packet further comprises:
   a second CRC field corresponding to a CRC of the entire PDU payload.

40. The wireless device of claim 36, wherein the instructions to receive the AoA packet includes instructions to receive the PDU payload with the supplemental field un-encrypted, the program code further comprising instructions to decrypt at least a portion of the PDU payload without decrypting the supplemental field.

41. The wireless device of claim 36, wherein the instructions to receive the AoA packet includes instructions to receive the PDU payload without the supplemental field whitened, the program code further comprising instructions to de-whiten at least a portion of the PDU payload without de-whitening the supplemental field.

42. The wireless device of claim 36, wherein the program code further comprises instructions to:
   switch among antennas of the antenna array while receiving the supplemental field of the PDU payload;
   capture in-phase and quadrature (I&Q) samples of the supplemental field;
   calculate one or more phase differences based on the I&Q samples; and
   estimate the angle of arrival based on the one or more phase differences.

43. The wireless device of claim 36, wherein the transceiver comprises a Bluetooth transceiver.

44. A non-transitory computer-readable medium including program code stored thereon for performing wireless communications by a wireless device, the program code comprising instructions to:
   generate a protocol data unit (PDU) header of an angle of arrival (AoA) packet, wherein the PDU header includes a reserved for future use (RFU) field and is compliant with Bluetooth version 4.0, 4.1 or 4.2;
   generate a PDU payload of the AoA packet corresponding to the PDU header, wherein the instructions to generate the PDU payload comprises instructions to:
   insert a supplemental field into the PDU payload to enable another wireless device to determine an angle of arrival of the AoA packet, the supplemental field comprising only a string of bits with identical logic states configured to generate a continuous waveform, and insert a cyclic redundancy check (CRC) field into the PDU payload, the CRC field corresponding to a CRC of at least the supplemental field;
   modify the PDU header by replacing one or more reserved bits of the RFU field to indicate that the PDU payload includes the supplemental field; and transmit the AoA packet with an antenna of the wireless device.

45. The non-transitory computer-readable medium of claim 44, wherein the instructions to generate the PDU payload of the AoA packet further comprise instructions to generate the PDU payload to include:
   a supplemental information field;
   an opcode;
   the CRC field, wherein the CRC field corresponds to a CRC from an end of a PDU header, through the supplemental information field, to an end of the opcode;
   the supplemental field; and a second CRC field corresponding to a CRC of the entire PDU payload.

46. The non-transitory computer-readable medium of claim 45, wherein the supplemental information field includes at least one field selected from the group: a supplemental time field indicating a length of the supplemental field, a reserved field, and a supplemental type field.

47. A non-transitory computer-readable medium including program code stored thereon for performing wireless communications by a wireless device, the program code comprising instructions to:
receive, at an antenna array of the wireless device, an angle of arrival (AoA) packet from another wireless device, wherein the AoA packet includes a protocol data unit (PDU) payload and a corresponding PDU header, and wherein the PDU header includes a reserved for future use (RFU) field and is compliant with Bluetooth version 4.0, 4.1 or 4.2;
determine whether one or more reserved bits of the RFU field indicate that the PDU payload a protocol data unit (PDU) payload of the AoA packet includes a supplemental field, the supplemental field comprising only a string of bits with identical logic states configured to generate a continuous waveform; and if so process the AoA packet to determine an angle of arrival of the AoA packet based on the supplemental field included in the PDU payload, wherein the instructions to process the AoA packet comprise instructions to perform a cyclic redundancy check (CRC) based on a CRC field included in the PDU payload, the CRC field corresponding to a CRC of at least the supplemental field.

48. The non-transitory computer-readable medium of claim 47, wherein the PDU payload of the AoA packet further comprises:
a supplemental information field;
an opcode;
the CRC field, wherein the CRC field corresponds to a CRC from an end of a PDU header, through the supplemental information field, to an end of the opcode;
the supplemental field; and
a second CRC field corresponding to a CRC of the entire PDU payload.

49. The non-transitory computer-readable medium of claim 48, wherein the instructions to process the AoA packet further comprise instructions to:
read the supplemental information field included the PDU payload of the AoA packet, wherein the supplemental information field includes at least one field selected from the group of: a supplemental time field indicating a length of the supplemental field, a reserved field, and a supplemental type field.

50. A wireless device, comprising:
means for generating a protocol data unit (PDU) header of an angle of arrival (AoA) packet, wherein the PDU header includes a reserved for future use (RFU) field and is compliant with Bluetooth version 4.0, 4.1 or 4.2;
means for generating a PDU payload of the AoA packet corresponding to the PDU header, wherein the means for generating the PDU payload includes:
means for inserting a supplemental field into the PDU payload to enable another wireless device to determine an angle of arrival of the AoA packet, the supplemental field comprising only a string of bits with identical logic states configured to generate a continuous waveform, and means for inserting a cyclic redundancy check (CRC) field into the PDU payload, the CRC field corresponding to a CRC of at least the supplemental field;
means for modifying the PDU header by replacing one or more reserved bits of the RFU field to indicate that the PDU payload includes the supplemental field; and
means for transmitting the AoA packet.

51. The wireless device of claim 50, wherein the means for generating the PDU payload of the AoA packet further comprises means for generating the PDU payload to include:
a supplemental information field;
an opcode;
the CRC field, wherein the CRC field corresponds to a CRC from an end of a PDU header, through the supplemental information field, to an end of the opcode;
the supplemental field; and
a second CRC field corresponding to a CRC of the entire PDU payload.

52. The wireless device of claim 51, wherein the supplemental information field includes at least one field selected from the group: a supplemental time field indicating a length of the supplemental field, a reserved field, and a supplemental type field.

53. A wireless device, comprising:
means for receiving an angle of arrival (AoA) packet from another wireless device, wherein the AoA packet includes a protocol data unit (PDU) payload and a corresponding PDU header, and wherein the PDU header includes a reserved for future use (RFU) field and is compliant with Bluetooth version 4.0, 4.1 or 4.2;
means for determining whether one or more reserved bits of the RFU field indicate that the PDU payload of the AoA packet includes a supplemental field, the supplemental field comprising only a string of bits with identical logic states configured to generate a continuous waveform; and
if so means for processing the AoA packet to determine an angle of arrival of the AoA packet based on the supplemental field included in the PDU payload, wherein the means for processing the AoA packet comprises means for performing a cyclic redundancy check (CRC) based on a CRC field included in the PDU payload, the CRC field corresponding to a CRC of at least the supplemental field.

54. The wireless device of claim 53, wherein the PDU payload of the AoA packet further comprises:
a supplemental information field;
an opcode;
the CRC field, wherein the CRC field corresponds to a CRC from an end of a PDU header, through the supplemental information field, to an end of the opcode;
the supplemental field; and
a second CRC field corresponding to a CRC of the entire PDU payload.

55. The wireless device of claim 54, wherein the means for processing the AoA packet further comprises:
means for reading the supplemental information field included the PDU payload of the AoA packet, wherein the supplemental information field includes at least one field selected from the group of: a supplemental time field indicating a length of the supplemental field, a reserved field, and a supplemental type field.

* * * * *